(12) United States Patent
Ono et al.

(10) Patent No.: US 10,297,840 B2
(45) Date of Patent: May 21, 2019

(54) FILM MEMBER STACKING DEVICE AND METHOD OF THE SAME

(71) Applicant: NISSAN MOTOR CO., LTD., Yokohama-shi, Kanagawa (JP)

(72) Inventors: Kei Ono, Yokohama (JP); Masaya Yamamoto, Yokosuka (JP); Norifumi Horibe, Fujisawa (JP); Kenichi Toyoshima, Yokohama (JP); Takayuki Terasaki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 77 days.

(21) Appl. No.: 14/418,016

(22) PCT Filed: Jun. 20, 2013

(86) PCT No.: PCT/JP2013/066957
§ 371 (c)(1),
(2) Date: Jan. 28, 2015

(87) PCT Pub. No.: WO2014/021016
PCT Pub. Date: Feb. 6, 2014

(65) Prior Publication Data
US 2015/0263361 A1    Sep. 17, 2015

(30) Foreign Application Priority Data

Jul. 30, 2012    (JP) ................. 2012-168968

(51) Int. Cl.
*H01M 8/02* (2016.01)
*H01M 8/0286* (2016.01)
(Continued)

(52) U.S. Cl.
CPC ....... *H01M 8/0286* (2013.01); *B32B 38/1841* (2013.01); *B65G 53/00* (2013.01);
(Continued)

(58) Field of Classification Search
CPC ... B32B 37/187; B32B 37/18; B32B 38/1841; B32B 37/16; B32B 37/182; B32B 38/18;
(Continued)

(56) References Cited

U.S. PATENT DOCUMENTS 3,709,843 A * 1/1973 Zocco ................ C08J 9/36
264/321
2004/0055701 A1   3/2004 Speer et al.

FOREIGN PATENT DOCUMENTS

DE    197 15 779 A1    10/1998
JP         3009898 U      4/1995
(Continued)

*Primary Examiner* — Milton I Cano
*Assistant Examiner* — Jennifer A Moss
(74) *Attorney, Agent, or Firm* — Foley & Lardner LLP

(57) ABSTRACT

A film member stacking device includes a block having a bottom surface portion provided with an outer end configured to contact with an inner end of an opening of a first film member. The outer end of the bottom surface portion of the block is larger than the inner end of the opening of the first film member. The film member stacking device further includes a member configured to uniformly force the first film member in a direction of the bottom surface portion of the block. The inner end of the opening of the first film member is positioned by the block, and the first film member is stacked on a second film member. The block is configured to resist deformation upon contact between the outer end of the bottom surface portion of the block and the inner end of the opening of the first film member.

13 Claims, 11 Drawing Sheets

(51) Int. Cl.
    *H01M 8/0273*     (2016.01)
    *B32B 38/18*     (2006.01)
    *B65G 53/00*     (2006.01)
    *H01M 8/1018*     (2016.01)
    *B32B 37/10*     (2006.01)
    *H01M 8/242*     (2016.01)

(52) U.S. Cl.
    CPC ..... *H01M 8/0273* (2013.01); *B32B 2037/109* (2013.01); *B32B 2309/105* (2013.01); *B32B 2457/18* (2013.01); *H01M 8/242* (2013.01); *H01M 2008/1095* (2013.01); *H01M 2250/20* (2013.01)

(58) Field of Classification Search
    CPC ............ B32B 38/1808; B32B 38/1825; B32B 38/1833; B32B 2037/109; A23G 3/554; A23G 3/2007; B29C 66/344; B29C 156/229; B29C 156/494; H01M 8/0286; H01M 8/02; H01M 8/08; H01M 8/24; H01M 8/2404; H01M 8/242
    See application file for complete search history.

(56) References Cited

FOREIGN PATENT DOCUMENTS

| | | |
|---|---|---|
| JP | 10-199551 A | 7/1998 |
| JP | 11-077723 A | 3/1999 |
| JP | 2001-351651 A | 12/2001 |
| JP | 2003-086232 A | 3/2003 |
| WO | WO 02/034515 A1 | 5/2002 |
| WO | WO 2010/114140 A1 | 10/2010 |

* cited by examiner (a)

(b)

(c)

(a)

(b)

(c)

(a)

(b)

(c)

FILM MEMBER STACKING DEVICE AND METHOD OF THE SAME

TECHNICAL FIELD

The present invention relates to a film member stacking device and a method of the same.

BACKGROUND ART

In recent years, a fuel cell, which operates even at room temperature and can have high power density, has been attracting attention as a power source for electric vehicles and as a stationary power source in response to social needs or trends based on energy or environmental problems. In principle, a product of a fuel cell due to an electrode reaction is water and the fuel cell is a clean power generation system having little impact on the global environment. Particularly, a polymer electrolyte fuel cell (PEFC) operates at a comparatively low temperature, and therefore, is anticipated as a power source for an electric vehicle.

Such a fuel cell includes a membrane electrode assembly (hereinafter, referred to as MEA) having an electrolyte membrane; a catalyst layer which is formed on both surfaces of the membrane; a gas diffusion layer (GDL); and the like. Moreover, the fuel cell is structured such that a plurality of MEAs are stacked through a separator.

The MEAs and the separators are alternately stacked and are further stacked together with a current collector plate that collects generated power; an insulating plate that insulates an end plate and the current collector plate; and the like.

A hole, through which fuel gas having hydrogen, air as oxidant gas, or the like is passed, is provided in each of these members. An O-ring, a gasket, or the like is disposed between each of the members to prevent leakage of these fluids.

In the related art, when manufacturing such a fuel cell, in order to position each of the members at each predetermined position, each side surface of the members are set to be brought into contact with a positioning guide (PTL 1).

CITATION LISTS

Patent Literature

[PTL 1] Publication of Japanese Patent Application 2003-86232

SUMMARY OF THE INVENTION

Problems to be Solved by the Invention

However, in the method disclosed in PTL 1, even though it is possible to position the MEAs, the separators, the current collector plates, the end plates, the insulating plates, and the like, it is not possible to position the O-rings, the gaskets and the like therebetween.

This happens because the O-ring or the gasket is deformed, even if the side surface (outer end) of the O-ring, the gasket, or the like is abutted to the guide since the O-ring, the gasket, or the like is thin and has low rigidity.

An object of the present invention is to provide a film member stacking device and a method of the same, which are capable of correcting deformation of a film member.

Means to Solve the Problems

In order to achieve the above-described object, the film member stacking device of the present invention includes a block provided with an outer end that contacts with an inner end of an opening of a first film member which has the opening, in which the inner end of the opening of the first film member is positioned by the block and the first film member is stacked on a second film member.

In addition, in order to achieve the above-described object, a method of stacking a film member of the present invention includes a step of positioning a first film member so that an inner end of an opening of the first film member contacts with an outer end of a block which is provided with the outer end that contacts with the inner end of the opening of the first film member which has the opening; and a step of stacking the first film member positioned by the block on the second film member.

Effects of the Invention

According to the present invention, the block is allowed to pass through the opening of the first film member so that the inner end of the opening of the first film member contacts with the outer end of the block. Accordingly, even if the first film member is deformed, it is possible to return the shape of the opening to its original shape by correcting the deformation and stack the first film member on the second film member.

EMBODIMENTS OF CARRYING OUT THE INVENTION

Figure 1:
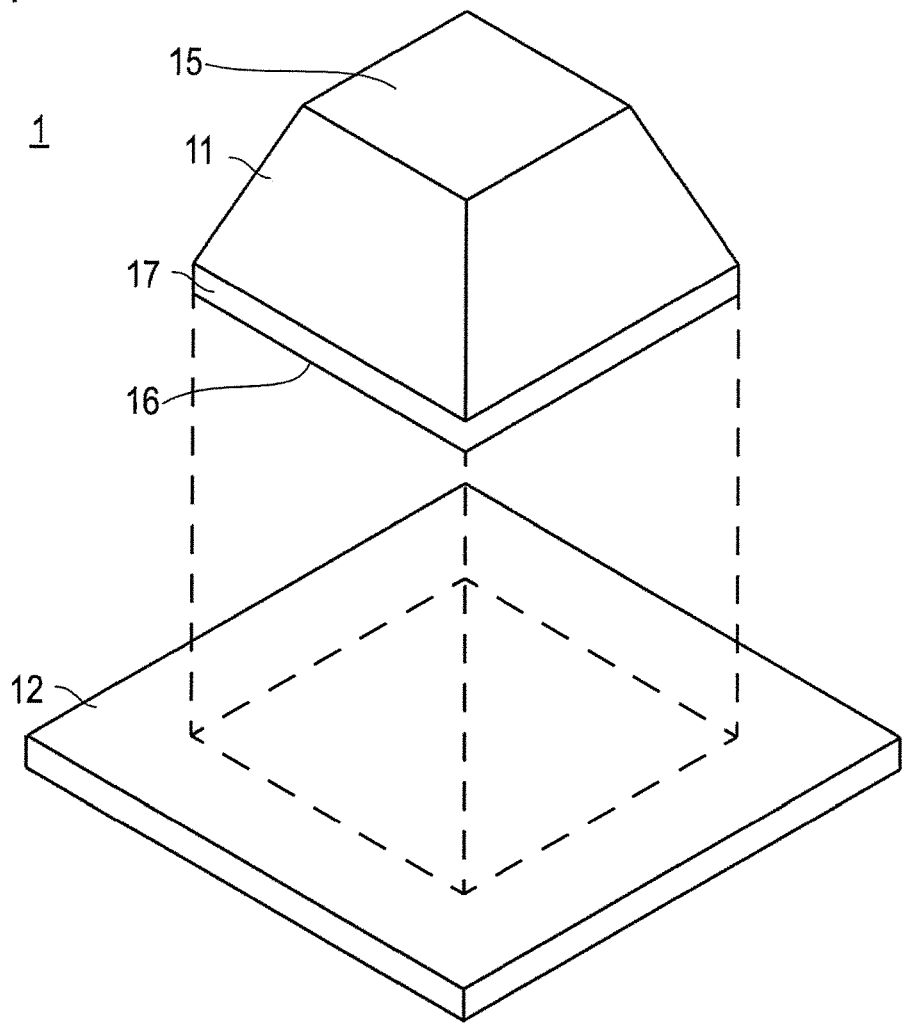
FIG. 1 is a schematic perspective view for illustrating a film member stacking device of a present embodiment 1.
Figure 1:
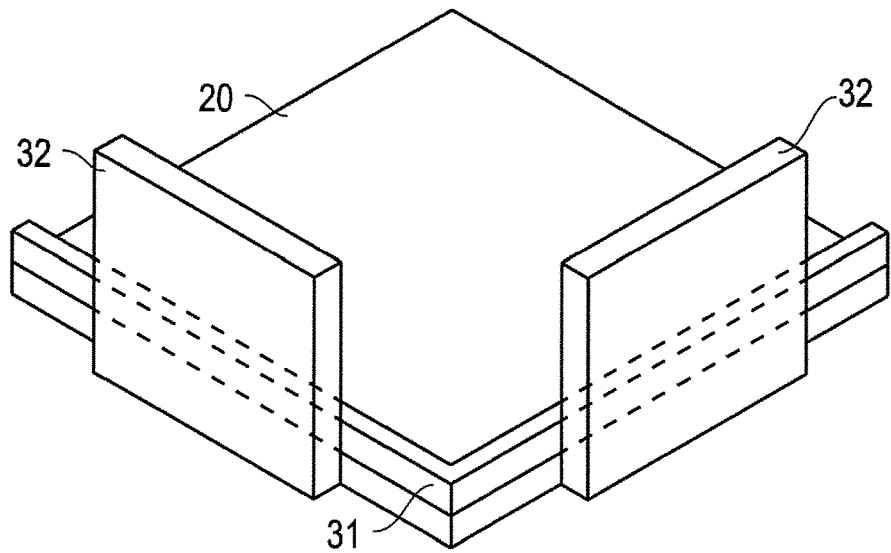

Hereinafter, embodiments of the present invention will be described with respect to accompanying drawings. The same elements in the description of the drawings are given the same reference numerals and the description thereof will not be repeated. In addition, the dimension ratio of the drawings is exaggerated for convenience of explanation, and in some cases, the dimension ratio is different from that of the actual ratio.

Embodiment 1

(Device Configuration)

FIG. 1 is a schematic perspective view for illustrating a film member stacking device of the present embodiment.

A film member stacking device 1 is used for stacking and affixing a gasket onto an MEA which is used for a fuel cell. Here, the gasket is a first film member and is a thin film-like member having an opening therein. The function of the gasket is to prevent gas, which passes through a catalyst layer, from leaking into the surroundings. The MEA is a second film member.

The film member stacking device 1 is formed of two portions. One of them is formed of a block 11 that is adapted to the shape of the opening inside the first film member and a first plate 12 which holds the first film member and onto which a block 11 is placed. Another one is formed of a second plate 20 for holding the second film member. The broken line in the drawing indicates a position at which the block 11 is placed on the first plate 12.

In addition, the film member stacking device 1 has a film guide 31 for positioning the second film member on the second plate 20; and a plate guide 32 for positioning the first plate 12 and the second plate 20, as accessories. The film guide 31 and the plate guide 32 are freely removable from the second plate 20. The film guide 31 and the plate guide 32 serve as a plate position adjusting means. The positioning method using the film guide 31 and the plate guide 32 will be described in a method of stacking the film member to be described later. In addition, the plate guide 32 may be provided on at least two adjacent sides of four sides of the second plate. The film guide 31 and the plate guide 32 may be provided so as to come into contact with all of the sides thereof. However, if the film guide and the plate guide are provided on all of the sides thereof, when setting the second film member on the second plate 20, the second film member needs to be put into the film guides 31 which are provided on the four sides thereof, which can be problematic. In contrast, if the film guide and the plate guide are provided so as to come into contact with two sides thereof, it is possible to perform the positioning without any problem. In addition, it is easy, since the second film member only have to be abutted against two sides thereof, when setting the second film member on the second plate 20.

The block 11 has a shape in which the top of a quadrangular pyramid shape is cut off. An upper surface portion 15 and a bottom surface portion 16 are quadrangles. The area of the upper surface portion 15 is smaller than that of the bottom surface portion 16. That is, the block is made to have the same outline from the bottom surface portion 16 to the upper surface portion 15 in a plan view viewed from an upper surface side or a bottom surface side, and the size thereof is made to decrease in a direction from the bottom surface portion 16 to the upper surface portion 15.

A vertical portion 17 having a certain height is provided on the bottom surface portion 16. The vertical portion 17 becomes an outer end of the block. The vertical portion 17 contacts with an inner end of the opening of the first film member when positioning the first film member.

The height of the vertical portion 17 may be higher than or equal to at least the thickness of the first film member (for example, the gasket). The height thereof is not particularly limited, but it is preferable to have a height to the extent that the inner end of the opening of the gasket easily contacts with the vertical portion 17 when the block 11 is allowed to pass through the opening of the gasket. The thickness of the gasket is, for example, about 50 μm to 2 mm. Therefore, if the vertical portion 17 is made to have the same height in accordance with the thickness of the gasket, it becomes difficult to determine whether or not the inner end of the opening is reliably in contact with the vertical portion 17. Therefore, it is preferable that, when the block 11 is allowed to pass through the gasket, the vertical portion 17 has a height to the extent that the vertical surface of the vertical portion 17 can be seen and the situation where the inner end of the opening of the gasket is in reliable contact with the vertical portion 17 can be seen. For example, it is sufficient if the height of the vertical portion is about 1 mm to 10 mm.

In addition, the size of the bottom surface portion of the block is formed to be the same as or slightly greater than that of the opening of the first film member. Accordingly, when performing positioning by allowing the block 11 to pass through the opening of the first film member, it is possible to correct the shape of the first film member, in particular, the shape of the opening of the first film member to a shape having neither wrinkles nor distortion as the first film member is pulled.

The extent to which the size of the bottom surface portion 16 of the block is increased over that of the opening of the first film member cannot be flatly determined in accordance with the size of the entire first film member, the size of the opening thereof, or the material of the first film member. For this reason, the block may have a size to the extent that the wrinkles or the distortion of the first film member can be corrected. When the block 11 is excessively larger than the opening thereof, even if the shape of the first film member is corrected after allowing the block 11 through the opening thereof, the shape of the opening of the first film member is changed since the opening of the first film member tends to return to its original shape in a step in which the block 11 is removed. For this reason, there is a concern that the positioning accuracy may deteriorate. For example, in the case of the gasket, when the size of the shape which is formed by the inner end of the opening of the first film member as a space between opposite sides of the bottom surface portion of the block is regarded to be 100%, the shape formed by the outer end of the bottom surface portion of the block may be made larger to about 100.1% to 101%. With such a size, in view of the material (to be described later in detail) of the gasket, even if the block 11 is allowed to pass through the opening, it is possible to reliably correct the shape of the gasket without causing any deformation due to the block 11.

The height (vertical height from the bottom surface portion to a front surface portion) of the block 11 is not limited at all. The block 11 may have a height which facilitates handling when stacking a film using the block 11.

The block 11 may have any material as long as the material is not easily deformed. For example, it is possible to use various materials such as metals such as aluminum alloy, stainless steel, and brass; a hard plastic such as acrylic resin or polycarbonate; or a ceramic.

In addition, the block 11 may have a cavity therein as long as the external shape, in particular, the shape of the vertical portion 17, is maintained.

Figure 2:
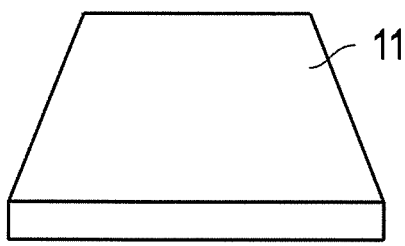
FIG. 2 is a view for illustrating an example of a shape of an opening of a first film member and a shape of a block.
Figure 2:
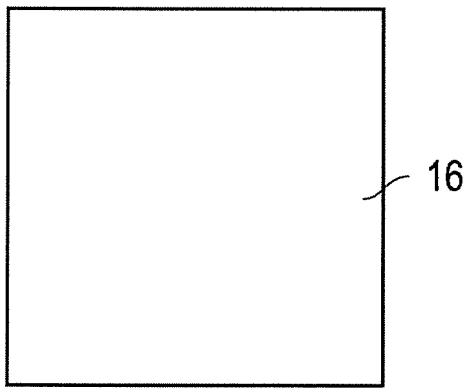
Figure 2:
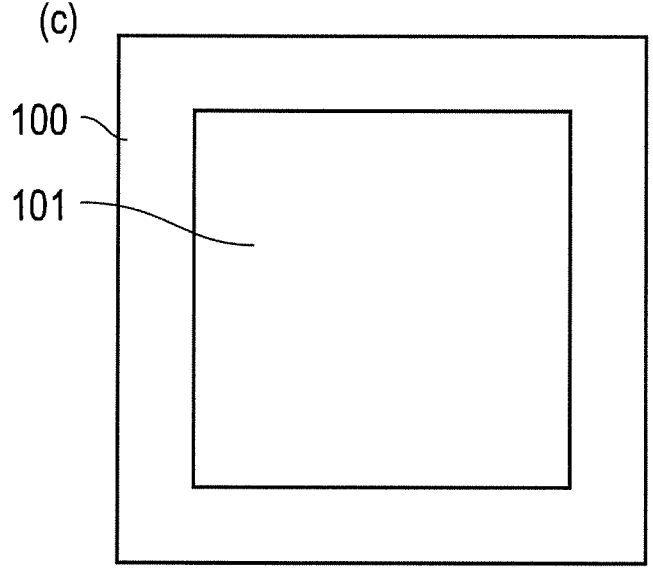
Figure 3:
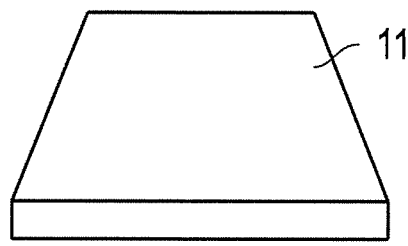
FIG. 3 is a view for illustrating an example of a shape of an opening of another first film member and a shape of a block.
Figure 3:
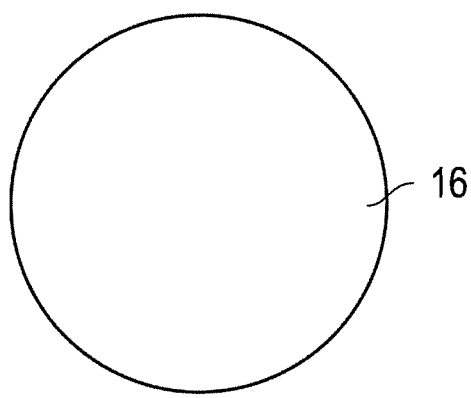
Figure 3:
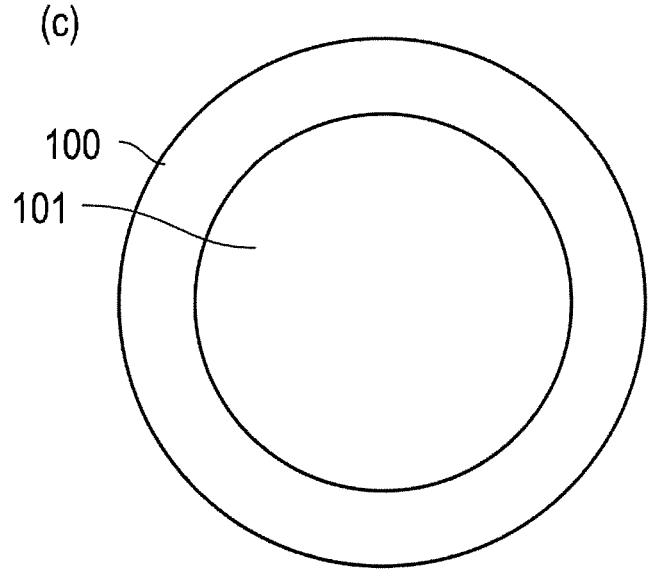
Figure 4:
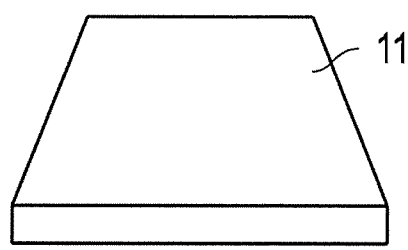
FIG. 4 is a view for illustrating an example of a shape of an opening of still another first film member and a shape of a block.
Figure 4:
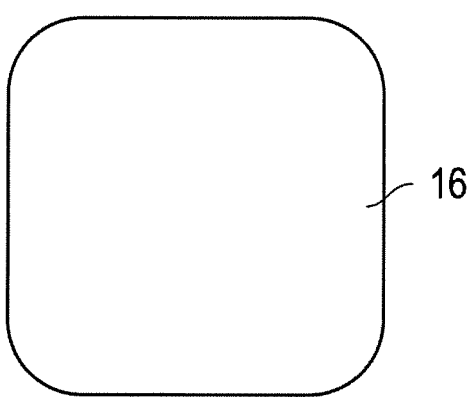
Figure 4:
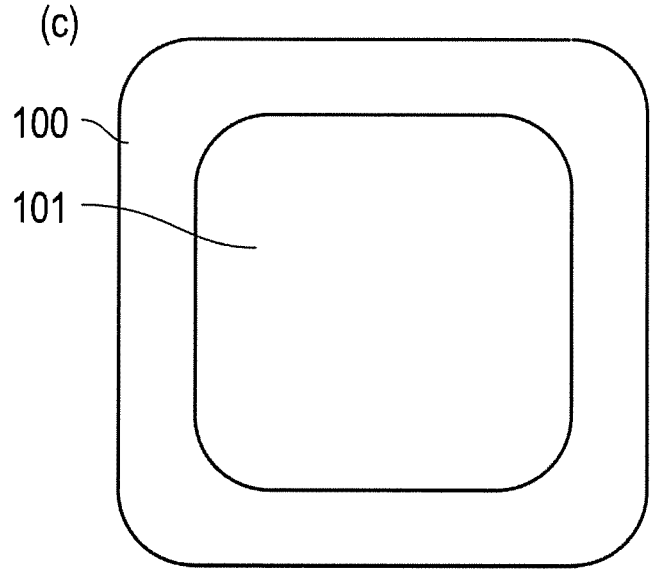

The block 11 is made to have a shape which is adapted to the shape of the opening of the first film member. FIGS. 2 to 4 are views for illustrating examples of the shapes of openings of the first film member and the shapes of blocks. In FIGS. 2 to 4, each (a) is a side view of the block 11, each (b) is a plan view of the bottom surface portion 16 of the block, and each (c) is a plan view of a first film member 100.

For example, when the shape of the opening 101 of the first film member 100 is a quadrangle as shown in FIG. 2(c), the shape of the bottom surface portion 16 of the block also becomes a quadrangular shape in accordance with the shape of the opening thereof as shown in FIGS. 2(a) and 2(b). This example corresponds to the block 11 shown in FIG. 1. The shape of the block shown herein is a square, but the same is true on a rectangle or the like. The size of the bottom surface portion 16 of the block is formed to be the same as or slightly greater than that of the opening 101 of the first film member 100. In the drawing, the size of the bottom surface portion of the block and the size of the opening of the first film member are drawn to be the same as each other (the same principle applies to other drawings).

In addition, for example, when the shape of the opening 101 of the first film member 100 is a circle as shown in FIG. 3(c), the shape of the bottom surface portion 16 of the block also becomes a circular shape in accordance with the shape of the opening thereof, as shown in FIGS. 3(a) and 3(b). Even in this case, similarly to FIG. 1, the block is similarly scaled down from the bottom surface portion 16 to the upper surface portion 15. Accordingly, the shape of the upper surface portion 15 also becomes a circular shape.

In addition, for example, when the shape of the opening 101 of the first film member 100 is a quadrangular shape with arc-like corners, as shown in FIG. 4(c), the shape of the bottom surface portion 16 of the block also becomes a quadrangular shape with arc-like corners in accordance with the shape of the opening thereof, as shown in FIGS. 4(a) and 4(b). Even in this case, similarly to FIG. 1, the block is similarly scaled down from the bottom surface portion 16 to the upper surface portion 15. Accordingly, the shape of the upper surface portion 15 also becomes a quadrangular shape with arc-like corners.

In addition, the shape of the block 11 may be determined in accordance with the various shapes of the gaskets.

Next, the first plate 12 is provided such that the block 11 is placed thereon, and holds the first film member which is positioned by the block 11.

Figure 5:
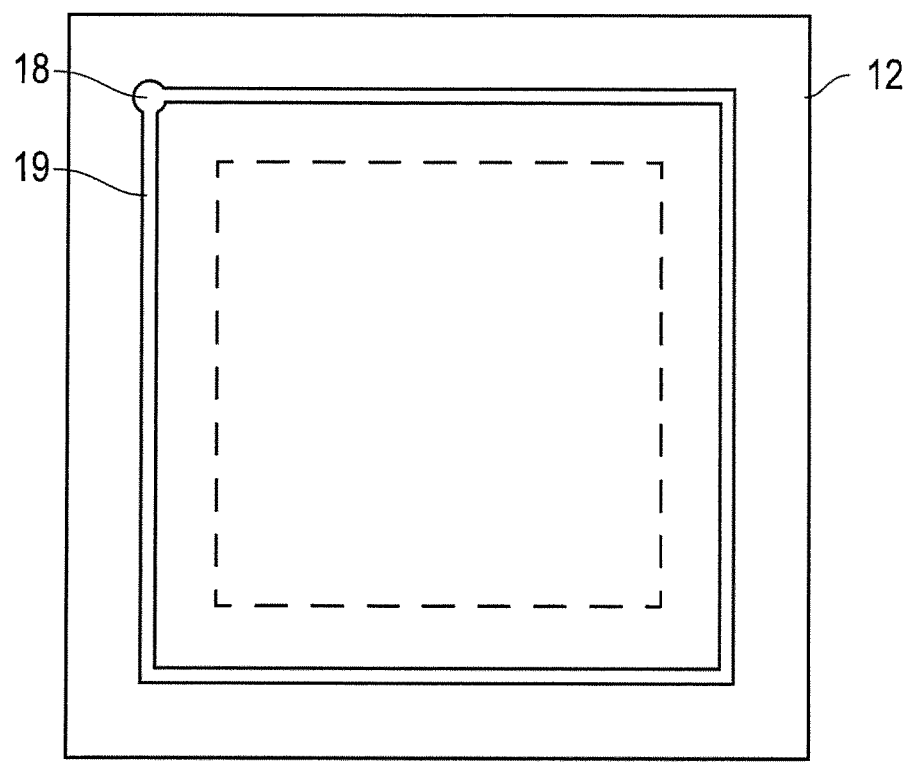
FIG. 5 is a plan view of a first plate.

FIG. 5 is a plan view of the first plate 12 and is a view when viewed from a side on which the block 11 is placed. The broken line in the drawing indicates a position at which the block 11 is placed.

As shown in the drawing, the first plate 12 is a flat plate-like member. In the first plate 12, in order to hold the first film member, for example, vacuum suction or electrostatic suction is used. In FIG. 5, a case of vacuum suction is illustrated. As shown in the drawing, there is a hole 18 which is connected to a vacuum suction device (not shown), and a groove 19 which is in communication with the hole 18. A single hole 18 or a single groove 19 may be provided. However, it is preferable that the groove 19 be provided so as to continuously surround the periphery of the position at which the block 11 is placed in order to reliably hold the first film member.

Besides this, although not shown in the drawing, a plurality of grooves 19 may be provided with respect to a hole 18, or a plurality of suction holes connected to a vacuum suction device may be provided so as to surround the periphery of the position at which the block 11 is placed, without providing the groove.

In addition, in order to more strongly perform the vacuum suction of the first film member, an O-ring (not shown) may be further provided in the outer periphery of the groove 19 (or a plurality of suction holes).

In a case of using the electrostatic suction, although not shown in the drawing, an electrode for the electrostatic suction may be provided so as to surround the periphery of the position at which the block 11 is placed.

With the first plate 12 which holds the first film member positioned by the block 11 in this manner, it is possible to maintain the corrected shape of the first film member, even after the block 11 is removed (refer to a method of stacking the film member to be described later).

There are various techniques for positioning the first plate 12 and the block 11. For example, the block 11 is positioned by providing a step in a portion of the first plate 12 on which the block 11 is placed. Bolt holes are provided in the first plate 12 and the block 11, and bolts, which pass through these bolt holes, are inserted therein in a state in which the block 11 is placed on the first plate 12 to fix and position the block thereto. A concave portion is provided on the first plate 12 and a convex portion is provided under the block 11 to position the block using the combination of the concave and convex portions. Besides, other techniques may be applied as long as the first plate 12 and the block 11 are positioned at a predetermined position. As a matter of course, the positioning of the block 11 with respect to the first plate 12 is performed to position the block 11 on the first plate 12 such that the inner end of the opening of the first film member is positioned at a predetermined position of the second film member.

However, a projection or the like is not provided on the surface of the first plate 12 on which the first film member is held. This is because the first film member held by the first plate 12 is superimposed on the second film member on the second plate 20 together with the first plate 12, as will be described later, and therefore, any projection on the surface of the first plate 12 on which the first film member is held interrupts the positioning therebetween.

It is preferable that the material of the first plate 12 be a non-metallic material, for example, a hard plastic such as acrylic resin or polycarbonate; or a ceramic. This is required in order to prevent any metal from being introduced to the second film member since the first plate 12 contacts with the second film member when stacking the first film member on the second film member. As a matter of course, the material of the first plate may be metal if the contact between the second film member and metal does not cause any problem.

Figure 6:
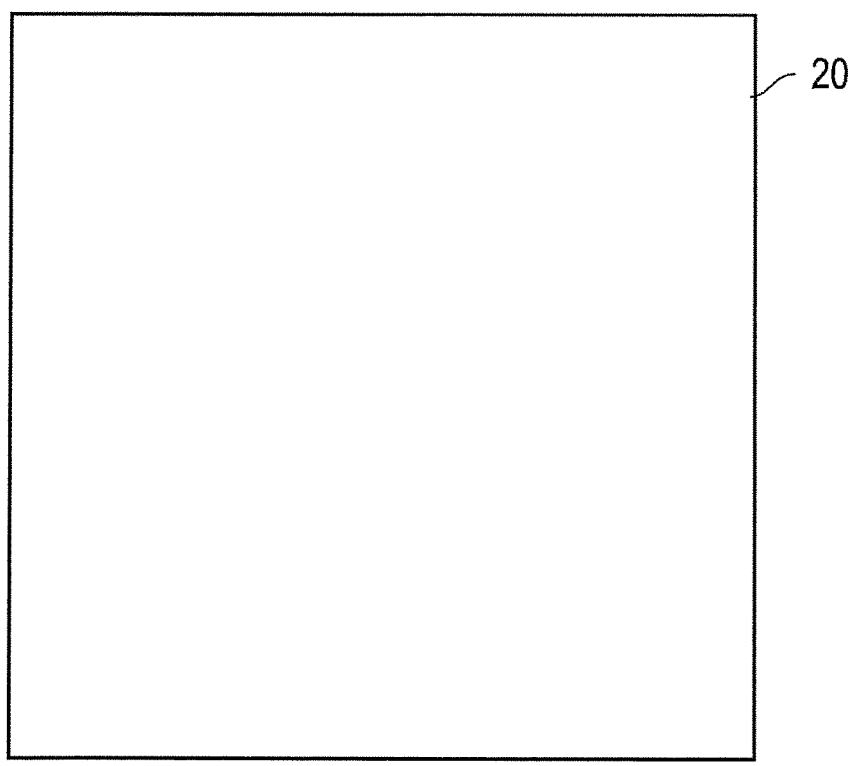
FIG. 6 is a plan view of a second plate.

Next, the second plate 20 is a plate for positioning the second film member. FIG. 6 is a plan view for illustrating the second plate 20.

As shown in the drawing, the second plate 20 has a flat plate-like shape. It is preferable that the material of the second plate 20 be a hard plastic such as acrylic resin or polycarbonate; or a ceramic, for example. The second plate 20 contacts with the second film member. Therefore, it is preferable that the second plate 20 be formed of a non-metallic material in a case in which the second film member (for example, an MEA) dislikes metal. As a matter of course, the material of the second plate may be metal if the contact between the second film member and metal does not cause any problem.

Although not shown in the drawing, the second plate 20 may hold the second film member through vacuum suction or electrostatic suction. This is required in order to prevent the position of the positioned second film member from moving during the stacking work since the second film member is also thin and light. If the second film member is to be positioned only by being allowed to still stand, such a holding device is not required.

(Method of Stacking Film Member)

A method of stacking a film member using the above-described film member stacking device 1 of the present embodiment 1 will be described.

Figure 7:
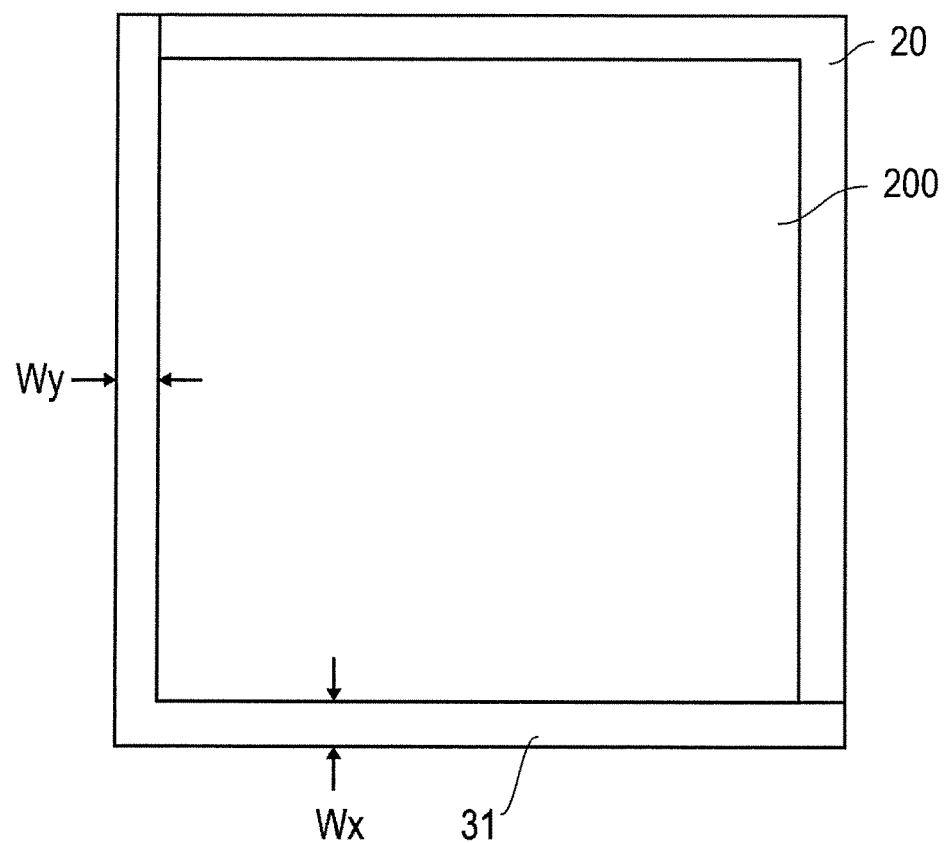
FIG. 7 is a view for illustrating a positional relationship of a second film member on the second plate.

First, the positional relationship between each member will be described. FIG. 7 is a view illustrating a positional relationship of the second film member on the second plate.

Here, an example of an MEA as a second film member 200 will be described. In the MEA, a catalyst layer 202 is formed on both surfaces of an electrolyte membrane 201 (in the drawing, only the catalyst layer 202 on one surface of the electrolyte membrane 201 is shown (the same applies to other drawings)). When stacking the first film member (here, gasket) on the MEA, it is desired that the gasket be stacked on the periphery of the catalyst layer without covering the catalyst layer. An MEA as the second film member 200 is a film member in which the catalyst layer (second member) 202 is formed on the electrolyte membrane (first member) 201.

A film guide 31 is provided in order to position and dispose the second film member 200 (MEA) at a predetermined position on the second plate 20, as illustrated in FIG. 7.

At this time, it is possible to position the second film member in an X direction and a Y direction on a plane coordinate by setting the width (w in the drawing) of the film guide 31 as a distance between each outer end of two adjacent sides of four sides of the second plate 20 and each outer end of the second film member 200 (MEA). Accordingly, the film guide 31 may be provided so as to have a predetermined distance from each outer end of the two adjacent sides of four sides of the second plate 20. In general, the distances thereof in the X direction and the Y direction may be the same as each other, and therefore, the widths (the width Wx in the X direction and the width Wy in the Y direction in the drawing) of the film guide 31 may be the same as each other. As a matter of course, if the second film member is to be located at a different position in the X direction and the Y direction, the width of the film guide 31 may be changed in accordance with the position.

In addition, the same principle applies to the plate guide 32, and it is possible to position the plate in an X direction and a Y direction on a plane coordinate (refer to FIG. 1) by providing a plate guide at each outer end of two adjacent sides of four sides of the second plate 20.

The film guide 31 may not be provided, and the second film member 200 (MEA) may be positioned by making the second film member 200 (MEA) be directly abutted against the plate guide 32.

Figure 8:
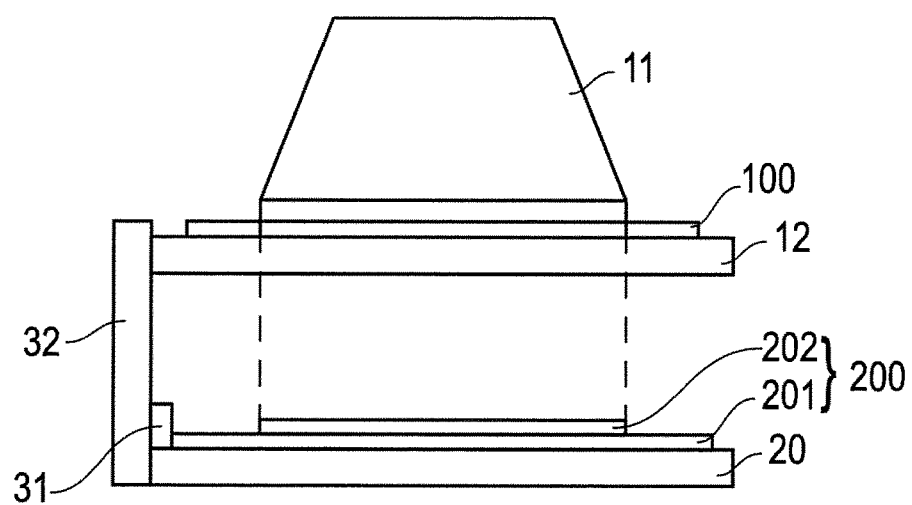
FIG. 8 is a side view for illustrating positional relationships between the first plate, the block, the second plate, and the second film member.

FIG. 8 is a side view for illustrating positional relationships between the first plate, the block, the second plate, and the second film member. The drawing is provided only to illustrate the positional relationships therebetween and is not for illustrating a state while stacking the first film member and the second film member. In addition, the film guide 31 and the plate guide 32 are provided on two adjacent sides of the second plate 20 as previously described, but only a side of the second plate 20 is shown in FIG. 8 to simplify understanding.

As illustrated in the drawing, the position of the block 11 with respect to the first plate 12 is set such that the inner end of the opening of the first film member 100 (gasket) is coincident with the outer end of the catalyst layer 202 or is positioned slightly outside the outer end thereof (in the drawing, the inner end of the opening thereof is coincident with the outer end of the catalyst layer) in a state in which each side portion of the first plate 12 and the second plate 20 is positioned so as to be flush with each other using the plate guide 32. That is, the outer end of the block 11 is set to be coincident with or to be positioned slightly outside the outer end of the catalyst layer 202 of the second film member 200 (MEA) on the second plate 20.

It is possible to stack the first film member 100 (gasket) on the periphery of the catalyst layer 202 by simply positioning the first plate 12 and the second plate 20 using the plate guide 32, by positioning these members in this manner.

When the gasket is stacked on an MEA, it is preferable that there is no gap between the outer end of the catalyst layer and the inner end of the opening of the gasket. However, a slight gap therebetween will not be a problem. The function of the gasket is to prevent leakage of gas which is passed through the catalyst layer. For this reason, if the gasket is hung on the catalyst layer and covers a portion of the catalyst layer, the utilization efficiency of the catalyst layer deteriorates, which is not preferable. In contrast, there is no influence on the effect of preventing leakage of the gas, even if there is a gap between the outer end of the catalyst layer and the inner end of the opening of the gasket. Therefore, even a slight gap therebetween will not be a problem.

Figure 9:
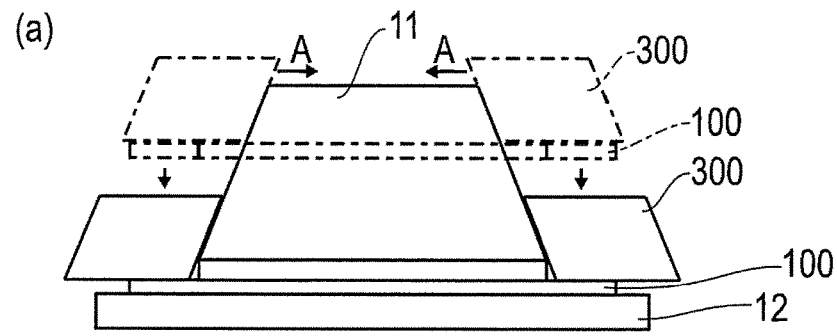
FIG. 9 is a view for illustrating a stacking method of the present embodiment 1.
Figure 9:
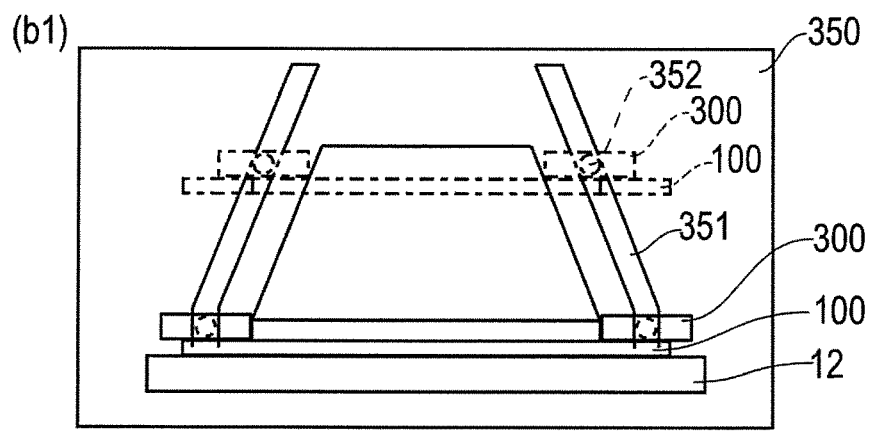
Figure 9:
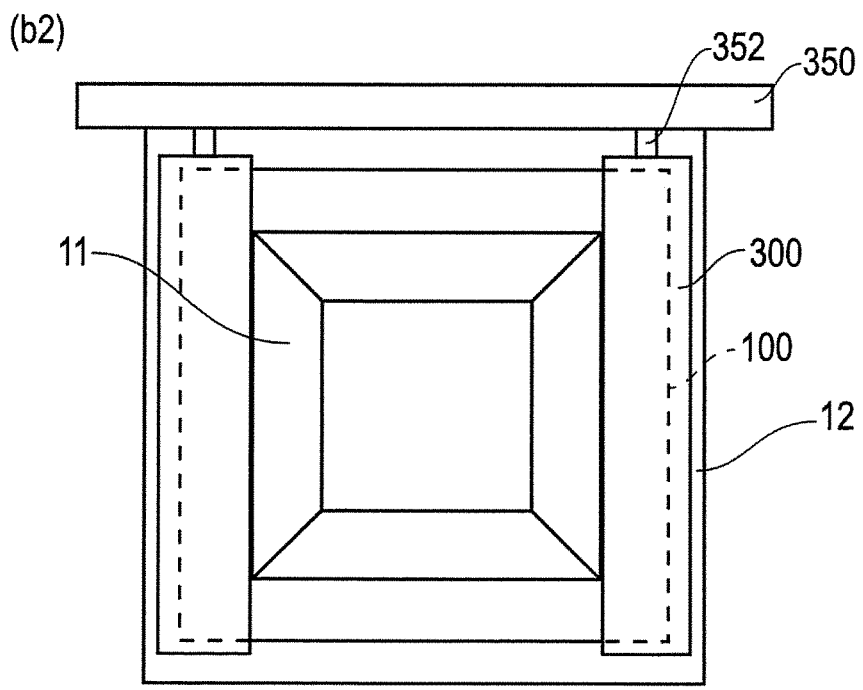
Figure 10:
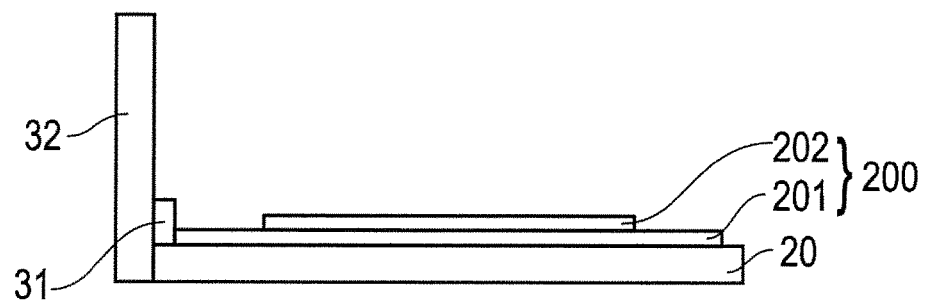
FIG. 10 is a view for illustrating the stacking method of the present embodiment 1.
Figure 11:
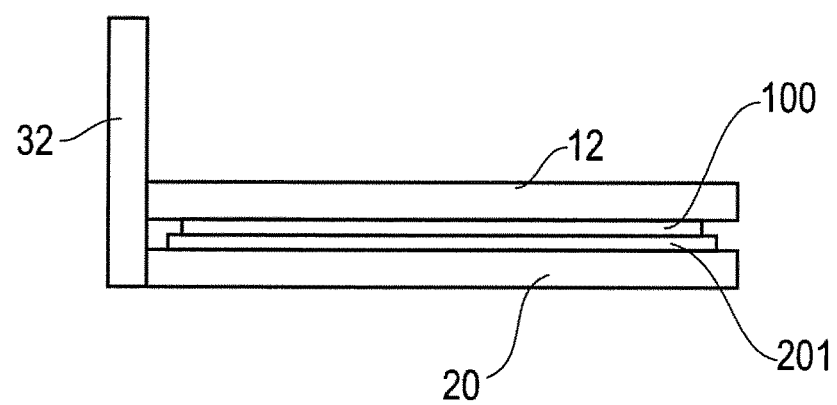
FIG. 11 is a view for illustrating the stacking method of the present embodiment 1.

The stacking method will be described. FIGS. 9 to 11 are views for illustrating the stacking method of the present embodiment 1.

First, the block 11 is placed on the first plate 12. Then, the first film member 100 is compressed onto the surface of the first plate 12 such that the block 11 is passed through the opening of the first film member 100 from the top of the block 11. At this time, the opening is reliably put up to the bottom surface portion 16 of the block 11, that is, the opening is reliably put thereto so as to be attached to the surface of the first plate 12.

This may be accomplished using a squeegee 300 or the like as shown in FIG. 9(*a*). The squeegee 300 uniformly compresses the first film member 100 in a direction of the bottom surface portion 16 of the block 11 along the slope of the block 11 from the top of the block 11 such that the first film member is attached to the surface of the first plate 12 (that is, in the drawing, the squeegee 300 is moved from the position of the alternate long and short dash line to the position of the solid line). The squeegee 300 may compress the first film member in a direction of the bottom surface portion 16 while maintaining the tension in a direction (arrow A shown in the drawing) of squeezing the block 11, at all times. This may be accomplished, for example, by squeezing the squeegee 300 by using foamed urethane or the like having excellent elasticity.

Alternately, as shown in FIGS. 9(*b*1) and 9(*b*2), a guide plate 350 is provided separately, and the squeegee 300 is configured to be moved along a groove 351 (or a rail) which is provided on the guide plate 350. The groove 351 (or the rail) on the guide plate 350 is provided such that a bracket 352 moves along the inclination of the slope of the block 11. The squeegee 300 is attached to the bracket 352 so as to be able to move along the slope of the block 11 at all times. Accordingly, the squeegee 300 compresses the first film member 100 in the direction of the bottom surface portion 16 of the block 11 by being guided by the groove 351 (or the rail) from the top of the block 11 such that the first film member is attached to the surface of the first plate 12 (that is, in the drawing, the squeegee 300 is moved from the position of the alternate long and short dash line to the position of the solid line).

FIG. 9(*b*1) is a view showing the guide plate when viewed from a side direction of the block and FIG. 9(*b*2) is a view including the guide plate when viewed from a direction of the upper surface portion of the block (FIG. 9(b2) shows a state in which the first film member 100 is attached to the surface of the first plate 12).

FIGS. 9(a), 9(b1), and 9(b2) show views in which the squeegee 300 is provided so as to come into contact with two facing sides (slopes) of the block 11. However, the squeegee may be provided so as to come into contact with all of the four sides (slopes) of the block 11.

An adhesive is applied to both surfaces or to a single surface of the gasket, which is the first film member 100, used herein in advance. Release paper is spread on the surface of the adhesive surface in order to prevent the adhesive surface from being attached to other members while working.

Next, once the first film member 100 is compressed up to the bottom surface portion 16 of the block 11, the first plate 12 holds the first film member 100. Then, the block 11 is removed.

Meanwhile, as shown in FIG. 10, the plate guide 32 is disposed on the outer periphery of the second plate 20 and the film guide 31 is provided on the second plate 20 along the plate guide 32. Then, the second film member 200 is positioned by the film guide 31 and is placed on the second plate 20. The film guide 31 and the plate guide 32 are provided on two adjacent sides of the second plate 20 as previously described. However, only a side is shown in FIG. 10 for easy understanding.

Next, as shown in FIG. 11, the film guide 31 is removed from the second plate 20. Then, the release paper of the first film member 100 on the first plate 12 is peeled off, and then, the first plate 12 is put on the second plate 20 along the plate guide 32 by making the surface of the first film member face the second plate 20. Accordingly, the first film member 100 is affixed onto the second film member 200. At this time, a pressure by which the first plate 12 is pressed in the second plate 20 direction may be applied such that the first film member 100 and the second film member 200 are closely adhered to each other. The plate guide 32 is provided on two adjacent sides of the second plate 20 as previously described. However, only a side is shown in FIG. 11 for easy understanding.

As described above, a stacked body configured to have the first film member 100 and the second file member is formed. In a case of stacking the first film member 100 on both the surfaces of the second film member 200, the same operation may be performed after turning over the second film member 200 thereafter.

In the present embodiment 1, the positioning of the first film member 100 on the first plate 12 and the positioning of the second film member 200 on the second plate 20 can be independently performed.

In addition, in the above-described stacking method, the block 11 was set to be previously positioned on the first plate 12 in relation to the second film member 200 on the second plate 20. However, the present invention is not limited thereto and the block 11 may be put on the first plate 12 regardless of the position of the second film member 200 on the second plate 20. In this case, after holding the first film member 100 using the first plate 12, the first film member may be positioned with respect to the second film member 200. In this case, the film guide 31 and the plate guide 32 are not required.

Embodiment 2

(Device Configuration)

Figure 12:
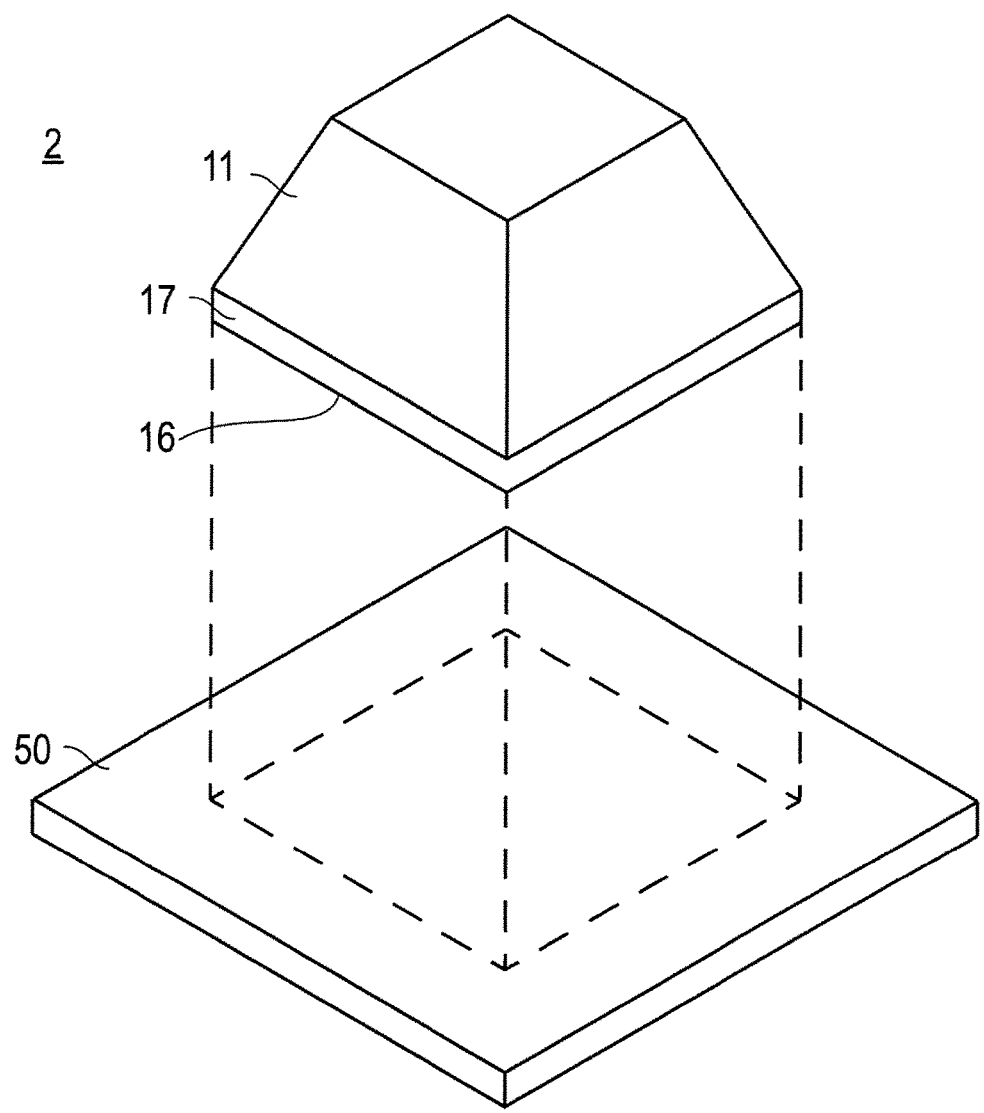
FIG. 12 is a schematic side view for illustrating a film member stacking device of a present embodiment 2.

FIG. 12 is a schematic side view for illustrating a film member stacking device 2 of a present embodiment 2.

A film member stacking device 2 is used for stacking and affixing a gasket onto an MEA which is used for a fuel cell. Here, the gasket is a first film member 100 and is a thin film-like member having an opening therein. The function of the gasket is to prevent gas, which passes through a catalyst layer, from leaking into the surroundings. The MEA is a second film member 200.

The film member stacking device 2 has a plate 50 for holding the second film member 200 (not shown in FIG. 12), and a block 11 which is placed on the second film member held by the plate 50 and performs positioning of a first film member 100 and correction of the shape of the first film member.

The plate 50 is a flat plate-like member. Here, a material which transmits at least light required for the positioning to be described later is used. For example, hard and light transparent members such as acrylic resin or polycarbonate are preferably used.

The plate 50 preferably holds the second film member 200 through vacuum suction or electrostatic suction. This is used in order to prevent the position of the positioned second film member 200 from moving during the stacking work since the second film member 200 is also thin and light. If the second film member 200 is to be positioned only by being allowed to still stand, such a holding device is not required.

The block 11 is the same as the block 11 described in the embodiment 1. That is, the block has a shape in which the top of a quadrangular pyramid shape is cut of f. A vertical portion 17 having a certain height is provided on a bottom surface portion 16. The vertical portion 17 becomes an outer end of the block. The vertical portion 17 contacts with an inner end of the opening of the first film member 100 when positioning the first film member 100.

However, it is preferable that the material of the block 11 be, for example, a hard plastic such as acrylic resin or polycarbonate; or a ceramic. In the present embodiment 2, the block 11 is directly placed on the second film member 200. For this reason, it is preferable to use non-metallic materials in case direct contact between the second film member 200 and metal is not preferable. As a matter of course, the material of the first block may be metal if the contact between the second film member 200 and metal does not cause any problem.

(Method of Stacking Film Member)

A method of stacking a film member using the above-described film member stacking device 1 of the present embodiment 2 will be described.

Figure 13:
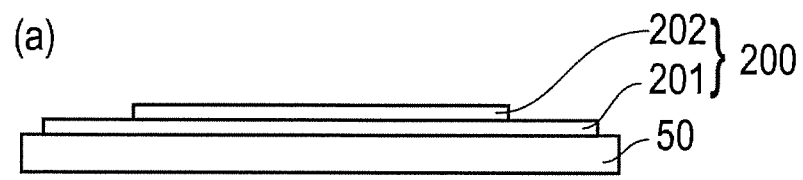
FIG. 13 is a view for illustrating a stacking method of the present embodiment 2.
Figure 13:
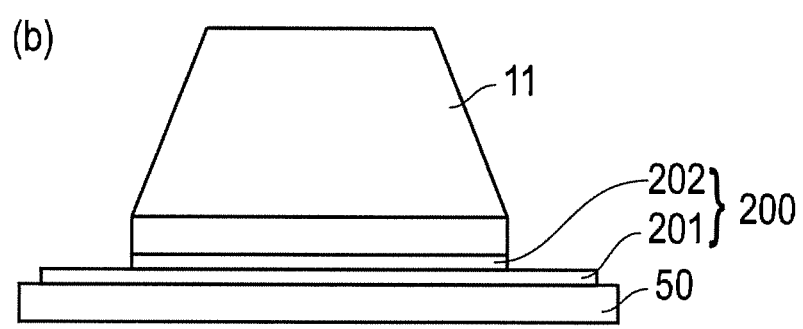
Figure 13:
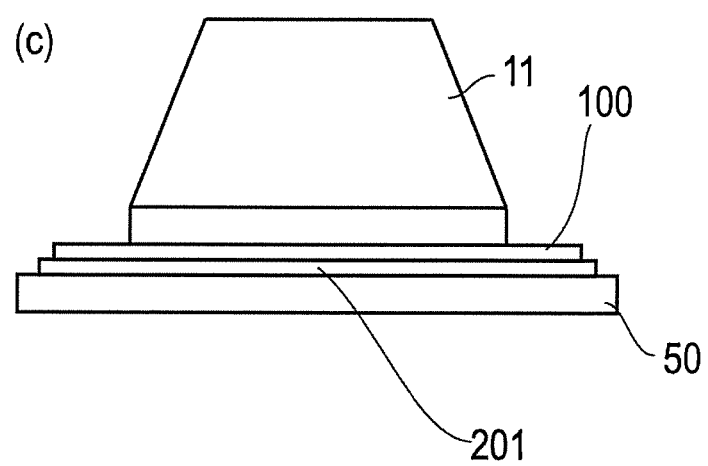

FIG. 13 is a view for illustrating a stacking method of the present embodiment 2.

Similarly to the embodiment 1, the first film member 100 is a gasket and the second film member 200 is an MEA also in the embodiment 2. In addition, an adhesive is applied to both surf aces of the gasket, which is the first film member 100, in advance, and release paper is affixed thereon.

First, as shown in FIG. 13(a), the second film member 200 is placed on the plate 50. At this time, any position of the second film member 200 with respect to the plate 50 may be taken on the second plate 50 as long as the position is within a range in which an end portion (in particular, a corner) of the catalyst layer is recognized using a camera to be described later.

Next, as shown in FIG. 13(b), the block 11 is placed at a predetermined position of the second film member 200, which is the catalyst layer herein. At this time, in order to check the position of the catalyst layer, it is possible to use, for example, a position detecting system using light.

The MEA which is the second film member 200 is a film member in which a catalyst layer (second member) 202 is formed on an electrolyte membrane (first member) 201. Light transmittance in the electrolyte membrane 201 and the catalyst layer 202 for this is different from each other. Specifically, the portion of the catalyst layer 202 has low light transmittance compared to the portion configured of only the electrolyte membrane 201 (that is, the periphery portion on which the catalyst layer is not formed). Therefore, when the plate 50 is exposed to light from the bottom of the plate and the transmitted light is photographed using a camera from the top of the plate, a portion with the catalyst layer in the photographed image is dark and the other portion is bright. Accordingly, the end portion of the catalyst layer 202 can be detected. An already existing position detecting system may be used for such a position detecting system. For example, a light source is disposed under the plate 50 and a camera is disposed on the top (a side on which the block 11 is placed) of the plate. Then, the block may be positioned by putting the image of the camera into a personal computer or the like and detecting the position of the catalyst layer, that is, the range of the dark portion in the image using image recognition software which is introduced in the personal computer in advance.

Positioning of the block 11 is performed so as to align an outer end of a bottom surface portion of the block at a position which is separated from the detected end portion of the catalyst layer by a predetermined amount. Here, the position separated from the end portion of the catalyst layer by a predetermined amount refers to an amount for separating the outer end of the block from the end portion of the catalyst layer which is detected by an amount corresponding to a different size when the size of the bottom surface portion of the block is larger than that of the catalyst layer. The size of the bottom surface portion of the block is the same as or slightly greater than that of the catalyst layer. This is required in order to prevent the gasket from being hung over the catalyst layer as also described in the embodiment 1.

The positioning of the block 11 may also be visually performed without using such a position detecting system.

Next, as shown in FIG. 13(c), the first film member 100 is pressed to and affixed on the second film member 200 such that the block 11 is passed through the opening of the first film member 100. At this time, the release paper is removed.

For the operation of allowing the block 11 to pass through the opening of the first film member 100, a squeegee or the like may be used similarly to the embodiment 1 (refer to FIG. 9).

A stacked body configured to have the first film member 100 and the second file member 200 is formed by removing the block 11. When removing the block 11, the first film member 100 may be pressed down so as to prevent the first film member from being peeled off from the second film member 200 along with the block 11. For this operation, it is possible to use, for example, the squeegee or the like, which is used when the first film member 100 is passed through the block 11, as it is, as a tool for pressing the first film member 100. Particularly, when the squeegee 300 is moved using the guide plate 350, since the guide plate 350 and the squeegee 300 are configured separately from the block 11, it is possible to remove the block 11 while pressing the first film member 100 using the squeegee 300.

As a matter of course, the first film member 100 may be pressed using other members (tools) instead of the squeegee. In addition, the first film member 100 may be prevented from being adhered to the block 11 when removing the block 11, by removing the block 11 after the first film member 100 is sufficiently compressed and adhered onto the second film member 200.

In addition, after removing the block 11, pressure may be applied to the first film member 100 and the second film member 200 for making the first film member and the second film member be closely adhered to each other.

In a case of stacking the first film member 100 on both the surfaces of the second film member 200, the same operation may be performed after turning over the second film member 200 thereafter.

[Action]

Actions which are common to the above-described embodiments 1 and 2 will be described.

Figure 14:
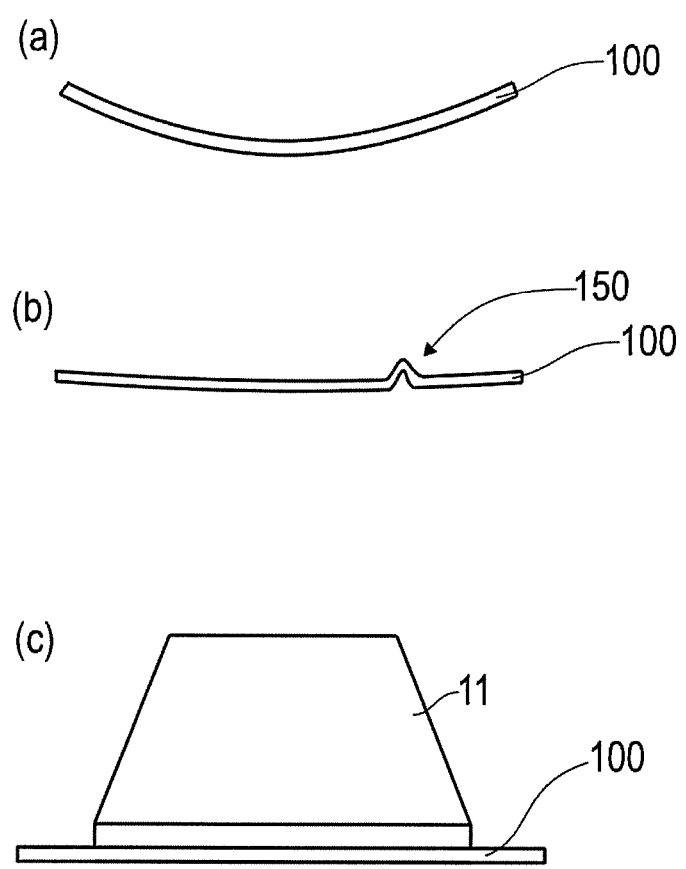
FIG. 14 is a view for illustrating actions of embodiments.

FIG. 14 is a view for illustrating actions of embodiments.

A thin film member such as a gasket having an opening therein is, for example, easily curled as a whole as shown in FIG. 14(a), or a wrinkle 150 is easily formed in a portion of the film member as shown in FIG. 14(b). For this reason, in some cases, the shape of the opening is not settled even if the film member is simply positioned at the outer end portion of the film member.

In the present embodiments 1 and 2, it is possible to correct the shape of the opening by stretching the opening of the first film member 100 as shown in FIG. 14(c) by allowing the block 11 to pass through the opening of the first film member 100.

In addition, as is previously described, it is possible to more reliably correct the shape of the opening of the first film member 100 by making the size of the block 11 be slightly larger than the size of the opening of the first film member 100.

In a case where there is a curl or a distortion in the film member, or the film member is wrinkled, manually spreading out the opening thereof to affix the opening onto a predetermined position requires a skill and does not go well if the operator is unskilled. From this point of view, it is possible to perform the positioning of the film member by automatically correcting such a shape of the opening using the block 11 as shown in the present embodiments 1 and 2. Particularly, in the case where the film member is an inextensible material such as the gasket, deformation which may occur in rubber or the like is not caused even if the film member is pulled by allowing the block 11 to pass through the opening. Therefore, the deformation such as the curl, the distortion, and the wrinkles can be solved by controlling only the inside of the opening.

Hereinafter, the gasket and the MEA (catalyst layer and electrolyte membrane) which are examples of the first and second film members will be described in detail.

[Gasket]

The gasket is the first film member 100 in the present embodiment. Examples of the gasket include rubber materials such as fluorine rubber, silicone rubber, ethylene propylene rubber (EPDM), and polyisobutylene rubber; fluorine-based polymeric materials such as polytetrafluoroethylene (PTFE), polyvinylidene fluoride (PVDF), polyhexafluoropropylene, tetrafluoroethylene-hexafluoropropylene copolymers (FEP); and thermoplastic resins such as polyolefin and polyester. In addition, there is no particular restriction on the thickness of the gasket, but the thickness thereof is preferably 50 μm to 2 mm and more preferably about 100 μm to 1 mm.

[Catalyst Layer]

The catalyst layer is a layer in which a reaction actually proceeds. Specifically, an oxidation reaction of hydrogen proceeds in an anode-side catalyst layer and a reduction reaction of oxygen proceeds in a cathode-side catalyst layer. The catalyst layer includes a catalyst component, a conductive carrier which carries the catalyst component, and a proton conductive polyelectrolyte.

As the catalyst component used in the anode-side catalyst layer, a well-known catalyst can be used without any particular limitation as long as the catalyst component has a catalyst action on the oxidation reaction of the hydrogen. In addition, as the catalyst component used in the cathode-side catalyst layer, a well-known catalyst can be used without any particular limitation as long as the catalyst component has a catalyst action on the reduction reaction of the oxygen. Specifically, the catalyst component is selected from metals such as platinum, ruthenium, iridium, rhodium, palladium, osmium, tungsten, lead, iron, chromium, cobalt, nickel, manganese, vanadium, molybdenum, gallium, and aluminum; and alloys thereof. However, it is natural that other materials can be used. Among these, a catalyst component at least containing platinum is preferably used in order to improve a catalytic activity, poisoning resistance with respect to carbon monoxide, heat resistance, and the like. The composition of the alloy depends on the type of metal to be alloyed, but may be set to 30 at. % to 90 at. % of platinum and 10 at. % to 70 at. % of metal to be alloyed. The composition of the alloy when using the alloy as a cathode-side catalyst varies depending on the type of metal to be alloyed, and can be appropriately selected by those skilled in the art. The composition thereof is preferably set to 30 at. % to 90 at. % of platinum and 10 at. % to 70 at. % of other metals to be alloyed. The alloy is a collective term for a material in which one or more kinds of metallic elements or non-metallic elements are generally added to a metallic element, and which has metallic properties. As the structure of the alloy, there is an eutectic alloy as a mixture of which component elements are formed of separate crystals, a structure of which component elements are completely dissolved together and become a solid solution, a structure of which component elements form an intermetallic compound or a compound of metal and non-metal, or the like, and any structure may be used in the present application. At this time, the catalyst component used in the anode catalyst layer and the catalyst component used in the cathode catalyst layer can be appropriately selected from the above. In the description of the present specification, the same definition is provided to describe both of the catalyst component used in the anode catalyst layer and the catalyst component used in the cathode catalyst layer, which are collectively called "catalyst component" unless otherwise specified. However, it is unnecessary that the catalyst component of the anode catalyst layer and the catalyst component of the cathode catalyst layer be the same as each other, and both the catalyst components can be appropriately selected so as to exhibit the above-described desired action.

As the shape or the size of the catalyst component, the same shape or the same size as that of the well-known catalyst component can be used without any particular restriction. However, it is preferable that the catalyst component have a granular shape. At this time, the average particle size of catalyst particles is preferably 1 nm to 30 nm, more preferably 1.5 nm to 20 nm, still more preferably 2 nm to 10 nm, and particularly preferably 2 nm to 5 nm. If the average particle size of the catalyst particles is a value within such a range, the balance, which relates to an effective electrode area in which an electrochemical reaction proceeds, between catalyst utilization efficiency and simplicity of carriage can be appropriately controlled. The "average particle size of the catalyst particles" in the present invention can be measured as an average value of crystallite diameters which are obtained by half-value width of a diffraction peak of catalyst components in X-ray diffraction or as an average value of particle sizes of catalyst components examined using a transmission type electron microscopic image.

The conductive carrier functions as a carrier for carrying the above-described catalyst component and as an electron conducting path which is involved in giving and receiving electrons between itself and the catalyst component.

Any conductive carrier may be used as long as the conductive carrier has a specific surface area for carrying a catalyst component in a desired dispersion state and has sufficient electron conductivity, and a carbon-based material of which the main component is carbon is preferable. Specific examples thereof include carbon particles formed of carbon black, graphitized carbon black, activated carbon, coke, natural graphite, artificial graphite, carbon nanotubes, carbon nanohorns, and carbon fibril structures. The expression that "the main component is carbon" refers to a carbon atom being included therein as a main component, and is a concept including both of comprising of only the carbon atom and substantially comprising of the carbon atom. Elements other than the carbon atom may be included therein in order to improve characteristics of the fuel cell depending on the circumstances. The expression that "substantially comprising of the carbon atom" means that contamination of impurities less than or equal to about 2 mass % to 3 mass % can be allowed.

Use of a graphitized conductive material or more preferably a graphitized carbon material such as graphitized carbon black in a catalyst layer, in particular, in an anode-side catalyst layer, as a conductive carrier, can improve corrosion resistance of the conductive material, which is preferable. However, the graphitized conductive material has a small covering area of an ion conductive material and has a small evaporation area of liquid water, and therefore, there is a concern that the conductive material may be frozen at a temperature below zero or may flood at room temperature. It is possible to improve drainage characteristics by setting a hydrophilic porous layer so as to make the hydrophilic porous layer adjacent to the catalyst layer using the graphitized conductive material. Moreover, a membrane electrode assembly to be described later is provided in which both starting property at a temperature below zero and high-current density operation at room temperature are achieved and to which corrosion resistance of the conductive material is imparted. It is preferable that the graphitized carbon black have a spherical shape; the average lattice surface spacing $d_{002}$ of a [002] surface which is calculated from X-ray diffraction be 0.343 nm to 0.358 nm; and the BET specific surface area be 100 m$^2$/g to 300 m$^2$/g.

The BET nitrogen specific surface area of the conductive carrier may be a specific surface area which is sufficient for highly dispersing and carrying the catalyst component, and is preferably 20 m$^2$/g to 1600 m$^2$/g and more preferably 80 m$^2$/g to 1200 m$^2$/g. If the specific surface area of the conductive carrier is a value within such a range, the balance between dispersibility of the catalyst component on the conductive carrier and effective utilization ratio of the catalyst component can be appropriately controlled.

The size of the conductive carrier is not also particularly limited, but the average particle size may be 5 nm to 200 nm and preferably about 10 nm to 100 nm in view of the simplicity of carriage, the catalyst utilization efficiency, and controlling the thickness of the electrode catalyst layer to be within an appropriate range.

In the electrode catalyst, the carried amount of the catalyst component with respect to the total amount of the electrode catalyst is preferably 10 mass % to 80 mass % and more preferably 30 mass % to 70 mass %. If the carried amount of the catalyst component is a value within such a range, the balance between the dispersibility of the catalyst component on the conductive carrier and the catalyst performance can be appropriately controlled. The carried amount of the catalyst component can be measured through inductively coupled plasma emission spectroscopy (ICP).

In addition, it is possible to perform the carriage of the catalyst component by a carrier through a well-known method. For example, it is possible to use well-known methods such as an impregnation method, a liquid-phase reduction carrying method, an evaporation to dryness method, a colloid adsorption method, a spray pyrolysis method, and a reversed micelle (microemulsion method).

A commercial product may be used as the electrode catalyst. Examples of such a commercial product include electrode catalysts manufactured by, for example, Tanaka Kikinzoku Kogyo K.K., N.E. CHEMCAT CORPORATION, E-TEK Inc., Johnson Matthey, and the like. These electrode catalysts are catalysts in which platinum or a platinum alloy is carried by a carbon carrier (20 mass % to 70 mass % of the carried concentration of catalyst species). In the above description, examples of the carbon carrier include Ketjen black, Vulcan, acetylene black, black pearl, graphitized carbon carrier (for example, graphitized Ketjen black) which is subjected to a heat treatment in advance at a high temperature, carbon nanotubes, carbon nanohorns, carbon fiber, and mesoporous carbon.

As described above, it is preferable that the BET nitrogen specific surface area of the electrode catalyst be greater than the BET specific surface area of the conductive material contained in the hydrophilic porous layer. In addition, as described above, it is preferable that the thickness of the catalyst layer be thicker than the adjacent hydrophilic porous layer.

The catalyst layer contains an ion conductive polyelectrolyte in addition to the electrode catalyst. The polyelectrolyte is not particularly limited, and well-known knowledge in the related art can be appropriately referred to. For example, an ion exchange resin constituting the above-described polyelectrolyte membrane can be added to the catalyst layer as the polyelectrolyte. When the catalyst layer is the hydrophilic porous layer, the above-described polyelectrolyte is used as the ion conductive material.

The thickness of the catalyst layer is not particularly limited as long as it is possible to exhibit the catalyst action of the oxidation reaction (anode-side) of hydrogen and the reduction reaction (cathode-side) of oxygen, and the same thickness as that in the related art can be used. Specifically, the thickness of each catalyst layer is preferably 1 μm to 10 μm. In addition, the method of coating the top of a base material with catalyst ink is not particularly limited, and similarly, well-known methods such as a screen printing method, a sedimentation method, and a spray method can be used.

As the base material, well-known sheets such as a polytetrafluoroethylene (PTFE) sheet, polyester sheets like a polyethylene-terephthalate (PET) sheet, and the like, can be used. The base material can be appropriately selected depending on the type of catalyst ink (particularly, conductive carrier such as carbon in the ink) to be used.

Moreover, the catalyst layer formed on the base material is transferred onto an electrolyte membrane and becomes an MEA. The MEA is the second film member 200 in the present embodiments.

[Electrolyte Membrane]

The electrolyte membrane is formed of an ion exchange resin and has a function of selectively transmitting a proton, which is generated in an anode-side catalyst layer while operating PEFC, to a cathode-side catalyst, layer along a thickness direction. In addition, the electrolyte membrane has a function as a partition for preventing fuel gas, which is supplied to the anode side, and oxidant gas, which is supplied to the cathode-side, from being mixed together.

The specific configuration of the electrolyte membrane is not particularly limited and a well-known electrolyte membrane in the related art in the field of the fuel cell can be appropriately employed. The electrolyte membrane is broadly classified into a fluorine-based polyelectrolyte membrane and a hydrocarbon-based polyelectrolyte membrane depending on the type of the ion exchange resin which is a constituent material. Examples of the ion exchange resin constituting the fluorine-based polyelectrolyte membranes include perfluorocarbon sulfonic acid-based polymers such as Nafion (registered trademark, manufactured by DuPont), Aciplex (registered trademark, manufactured by Asahi Kasei Corporation), Flemion (registered trademark, manufactured by Asahi Glass Co., Ltd.); a perfluorocarbon phosphonic acid-based polymer; a trifluoro styrene sulfonic acid-based polymer; an ethylene tetrafluoroethylene-g-styrene sulfonic acid-based polymer, an ethylene-tetrafluoroethylene copolymer, and polyvinylidene fluoride-perfluorocarbon sulfonic acid-based polymer. These fluorine-based polyelectrolyte membranes are preferably used in view of power generation performance such as heat resistance and chemical stability, and fluorine-based polyelectrolyte membranes constituted of the perfluorocarbon sulfonic acid-based polymer are particularly preferably used.

Specific examples of the hydrocarbon-based electrolyte include sulfonated polyether sulfone (S-PES), sulfonated polyaryl ether ketone, sulfonated polybenzimidazole alkyl, phosphonated polybenzimidazole alkyl, sulfonated polystyrene, sulfonated polyether ether ketone (S-PEEK), and sulfonated polyphenylene (S-PPP). These hydrocarbon-based polyelectrolyte membranes are preferably used in view of the manufacturing such as inexpensive raw materials, simple manufacturing process, and high selectivity of materials. The above-described ion exchange resin may be used singly or in combination of two or more thereof. In addition, the ion exchange resin is not limited to the above-described materials and it is natural that other materials may also be used.

The thickness of the electrolyte membrane may be appropriately determined in consideration of the characteristics of the obtained MEA or PEFC and there is no particular restriction. However, the thickness of the polyelectrolyte membrane is preferably 5 μm to 300 μm, more preferably 10 μm to 200 μm, and still more preferably 15 μm to 150 μm. If the thickness thereof is a value within such a range, the balance between strength while manufacturing a membrane or durability during use, and the output characteristics during use can be appropriately controlled.

According to the above-described embodiment, the following effects are exhibited.

(1) The embodiments 1 and 2 are set such that the block 11 is passed through the opening 101 of the first film member 100 such that the inner end of the opening of the first film member 100 contacts with the outer end of the block 11. Accordingly, even when the first film member 100 is deformed, it is possible to return the shape of the opening 101 to its original condition by correcting the deformation. Therefore, the opening 101 of the first film member 100 has its original shape when stacking the first film member on the second film member, and therefore, it is possible to position and stack the first film member as designed.

(2) Particularly in the embodiment 1, the first film member 100 is held by the first plate 12 and the second film member 200 is held by the second plate 20. Therefore, it is possible to separately perform the correction of the shape of the first film member 100 and the positioning of the first film member with respect to the second film member 200. In addition, it is possible to separately prepare the first film member 100 and the second film member 200.

(3) In addition, in the embodiment 1, the positioning of the opening of the first film member 100 and the second film member 200 is performed by positioning the first plate 12 and the second plate 20. Accordingly, it is possible to position and stack the opening of the first film member 100 at a predetermined position of the second film member 200 only by the positioning of the first and second plate.

(4) In addition, in the embodiment 2, the second film member 200 is held by one plate 50, the block 11 is placed from the top of the second film member 200, and the opening of the first film member 100 is positioned to the block 11. Accordingly, it is possible to correct the shape of the first film member 100 and to directly position the first film member to the second film member. In addition, the first film member 100 is positioned by placing the block 11 on the second film member 200, and therefore, the process is simple.

(5) In addition, in the embodiment 2, the end portion of the first member is detected by light using different light transmittance between the first member constituting the second film member 200 and the second member located thereon, and the block 11 is placed at a position separated from the detected end portion by a predetermined amount. Accordingly, it is possible to position the block 11 at a predetermined position of the second film member 200 using an optical system.

(6) In addition, commonly in the embodiments 1 and 2, the opening of the first film member 100 is a rectangle or a square and the block 11 has four sides that contact with each side of the rectangle or the square by corresponding to such a shape of the opening. Accordingly, it is possible to correct the shape of the opening of the rectangle or the square.

(7) In addition, commonly in the embodiments 1 and 2, the size of the shape formed by the outer end of the block 11 is the same as or slightly larger than the size of the shape formed by the inner end of the opening of the first film member 100 (that is, the size of the shape formed by the outer end of the block 11 is a size larger than or equal to the shape formed by the inner end of the opening of the first film member 100). Accordingly, it is possible to more reliably correct the shape of the opening 101 to its original shape by extending the deformed portion of the first film member 100 when positioning the opening 101 of the first film member 100 by allowing the block 11 to pass through the opening 101 of the first film member 100.

(8) In addition, commonly in the embodiments 1 and 2, the first film member 100 is a gasket used in a fuel cell, and the second film member 200 is a member which is used in the fuel cell and has a catalyst layer formed on a base material. The predetermined position on the second film member 200 is set to a position at which the inner end of the opening of the gasket is located on an outer side than the outer end of the catalyst layer. Accordingly, it is possible to stack the gasket so as to prevent the gasket from being hung over the catalyst layer.

Hereinbefore, the embodiments of the present invention have been described, but the present invention is not limited to the above-described embodiments and various modifications can be made.

For example, in the above-described embodiments, when stacking the gasket on an MEA, the sizes between the outer end of the catalyst layer and the inner end of the opening of the gasket are described to be the same as each other or to slightly have a space therebetween. However, the present invention is not limited thereto and the gasket may be set to be hung over the catalyst layer. In this case, it is not preferable to have a portion in which the gasket is hung over and a portion in which the gasket is not hung over the catalyst layer. The gasket is set to be partially hung over all of the sides of the catalyst layer. Particularly, when the gasket is affixed on both surfaces of the MEA, it is preferable to set the gasket so as to certainly hang over the four sides of the catalyst layer at an identical position on both the surfaces.

In addition, the first film member 100 is not limited to the gasket, and the present invention is applicable to any film-like member having an opening. In addition, the present invention is also applicable to an O-ring (for example, the shape as shown in FIG. 3) or the like.

In addition, needless to say, the present invention can have various modification modes which are determined by matters defined by the claims.

Furthermore, the present application is based on Japanese Patent Application No. 2012-168968, filed Jul. 30, 2012, and the disclosure thereof is referenced and incorporated as a whole.

EXPLANATION OF REFERENCE SIGNS 1, 2 film member stacking device,
11 block,
12 first plate,
15 upper surface portion,
16 bottom surface portion,
17 vertical portion,
18 hole,
19 groove,
20 second plate,
31 film guide,
32 plate guide,
50 plate,
100 first film member,
101 opening,
200 second film member.

The invention claimed is:
1. A film member stacking device, comprising:
a block having a bottom surface portion, an upper surface portion which is smaller than the bottom surface portion, and a slope portion which connects the bottom surface portion and the upper surface portion, the slope portion being fixed in position relative to the upper surface portion of the block, the bottom surface portion provided with an outer end configured to contact with an inner end of an opening of a first film member, wherein the outer end of the bottom surface portion of the block is larger than the inner end of the opening of the first film member, and a member configured to move along the slope portion of the block and uniformly force the first film member in a direction of the bottom surface portion of the block, wherein the inner end of the opening of the first film member is positioned by the block, and the first film member is stacked on a second film member, and wherein the block is configured to resist deformation upon contact between the outer end of the bottom surface portion of the block and the inner end of the opening of the first film member.

2. The film member stacking device according to claim 1, further comprising:

a first plate on which the block is placed and which is configured to hold the first film member, the first film member being positioned such that the inner end of the opening of the first film member contacts with the outer end of the block;

a second plate configured to position the second film member at a predetermined position and to hold the second film member; and a plate position adjusting unit that is configured to position the first plate and the second plate such that the opening of the first film member is at a predetermined position on the second film member in a state where the block is removed from the first plate, wherein the first plate and the second plate are separate from the member, which is configured to move along an inclined outer surface of the slope portion.

3. The film member stacking device according to claim 2, wherein the plate position adjusting unit is configured to position at least two adjacent sides of an outer end of the first plate and at least two adjacent sides of an outer end of the second plate at the same position as each other.

4. The film member stacking device according to claim 1, further comprising a plate that holds the second film member, wherein the block is placed at a predetermined position on the second film member, and the first film member is positioned by making the inner end of the opening contact with the outer end of the block and stacked on the second film member.

5. The film member stacking device according to claim 4, wherein the second film member has a film-like first member and a second member which is formed on the first member and has light transmittance which is different from that of the first member, and the device further comprises a detection unit that detects an end portion of the second member on the first member, and the block is placed on the second film member at a position, which is separated from the end portion detected by the detection unit by a predetermined amount, as the predetermined position.

6. The film member stacking device according to claim 1, wherein the opening of the first film member is a rectangle or a square, and the block has four sides which form the outer end and are configured to contact with each side of the rectangle or the square.

7. The film member stacking device according to claim 2, wherein the first film member is a gasket configured to be provided in a fuel cell, and the second film member is a member in the fuel cell and has a catalyst layer formed on a base material, and the predetermined position on the second film member is a position at which the inner end of the opening of the gasket is located on an outer side with respect to an outer end of the catalyst layer.

8. The film member stacking device according to claim 1, wherein the member comprises foamed urethane.

9. The film member stacking device according to claim 1, wherein the member is formed as a squeegee.

10. The film member stacking device according to claim 1, wherein the block is configured to withstand stress generated when the outer end of the bottom surface portion of the block contacts the inner end of the opening of the first film member.

11. The film member stacking device according to claim 1, wherein the block comprises at least one selected from the group consisting of metal, hard plastic, and ceramic.

12. A film member stacking device, comprising:

a block having a bottom surface portion, the bottom surface portion provided with an outer end configured to contact with an inner end of an opening of a first film member, wherein the outer end of the bottom surface portion of the block is larger than the inner end of the opening of the first film member, and a slope portion which connects the bottom surface portion and an upper surface portion of the block, the slope portion being fixed in position relative to the upper surface portion, a first plate on which the block is placed and which is configured to hold the first film member, a second plate configured to position a second film member at a predetermined position and to hold the second film member, a member configured to move along the slope portion and which is separate from the first plate and the second plate and configured to uniformly force the first film member in a direction of the bottom surface portion of the block, and a groove or a rail which is provided such that the member moves along the groove or the rail, wherein the inner end of the opening of the first film member is positioned by the block, and the first film member is stacked on the second film member, and wherein the block is configured to resist deformation upon contact between the outer end of the bottom surface portion of the block and the inner end of the opening of the first film member.

13. The film member stacking device according to claim 1, wherein:

the slope portion comprises four sloped surfaces;

each of the four sloped surfaces extends from a vertical surface portion, which is provided on the bottom surface portion, to a lowermost part of the upper surface portion; and the member is configured to contact a plurality of the four sloped surfaces.

* * * * *